United States Patent [19]

Kubo et al.

[11] 4,357,462

[45] Nov. 2, 1982

[54] PROCESS FOR PRODUCING LACTONE HIGH POLYMERS

[75] Inventors: Masayoshi Kubo; Kimio Inoue, both of Ohimachi, Japan

[73] Assignee: Daicel Chemical Industries, Ltd., Osaka, Japan

[21] Appl. No.: 244,392

[22] Filed: Mar. 16, 1981

[30] Foreign Application Priority Data

Apr. 23, 1980 [JP] Japan ................................. 55-53837

[51] Int. Cl.³ ............................................. C08G 63/10
[52] U.S. Cl. .................................................... 528/357
[58] Field of Search ......................................... 528/357

[56] References Cited

U.S. PATENT DOCUMENTS

| | | | |
|---|---|---|---|
| 2,878,236 | 3/1959 | Young et al. ........................ | 528/357 |
| 2,890,208 | 6/1959 | Young et al. ........................ | 528/357 |
| 3,197,445 | 7/1965 | Cline ................................ | 528/357 X |
| 3,232,911 | 2/1966 | Fukui et al. ......................... | 528/357 |
| 3,284,417 | 11/1966 | Hostettler et al. .................. | 528/357 |
| 3,442,871 | 5/1969 | Schmitt et al. ...................... | 528/357 |
| 3,468,853 | 9/1969 | Schmitt et al. ................. | 528/357 X |

*Primary Examiner*—Earl A. Nielsen
*Attorney, Agent, or Firm*—Flynn, Thiel, Boutell & Tanis

[57] ABSTRACT

A process for producing resinous lactone high polymers by the catalytic polymerization of lactones having a water content of less than 0.1% in the presence of a catalyst selected from the group consisting of stannous chloride, stannous bromide, stannous iodide, titanium trichloride, titanium tetrachloride, ammonium molybdate, zirconium nitrate, zirconium oxychloride and zirconium carboxylates, as a catalyst.

15 Claims, No Drawings

PROCESS FOR PRODUCING LACTONE HIGH POLYMERS

The present invention relates to a process for preparing lactone polymers having a polyester main chain by the ring-opening polymerization of a lactone, i.e., an intramolecular ester of hydroxycarboxylic acid. More particularly, the present invention relates to a process for producing a resinous (i.e. rigid) lactone high polymer having an average molecular weight of generally higher than 20,000.

Polyesters obtained from lactones, such as ϵ-caprolactone, can be divided roughly into two groups. One of the groups includes waxy solid or viscous liquid polyesters obtained by heating a lactone together with an organic compound (organic initiator) containing an active hydrogen-containing group such as a hydroxyl group or an amino group. They are used as polyurethane materials or plasticizers for vinyl resins. Those polyesters are low polymers having a molecular weight of up to several thousands (see U.S. Pat. Nos. 2,933,478 and 2,878,236).

The other group consists of resinous solid polymers of higher molecular weights. Unlike the waxy low polymer solids, the lactone high polymers having a molecular weight of at least 20,000 have a mechanical strength sufficient for practical purposes and they are usable as a material for the fabrication of films, molding coating materials and adhesives, including hot-melt adhesives. For example, poly-ϵ-caprolactone having a molecular weight of about 40,000 has been put on the market under the trademark PCL-700 by Union Carbide Corp.

According to the manufacturer's catalogue, this product has a tensile strength of 3,000–4,000 psi (210–280 Kgf/cm$^2$) and an elongation of 500–1,000%.

The present invention relates to a process for preparing such resinous, solid, lactone high polymers. Processes for preparing such resinous, lactone high polymers have been disclosed in the specifications of U.S. Pat. Nos. 3,021,310, and 3,021,309, U.S. patent application Ser. No. 315,669 in 1963 and U.S. patent application Ser. No. 812,310 in 1969. It has been disclosed in those specifications that the average molecular weights of the polymers are in the range of, for example, 900–250,000, or the average molecular weights are up to several tens of thousands or several hundreds of thousands. According to the examples given in the specifications, strongly crystalline, fiber-forming solids are obtained, although the specific molecular weights of them are unclear.

The catalysts used for obtaining lactone high polymers in the above prior techniques are organometallic compounds, such as phenylmagnesium bromide, butyl lithium, polyisobutyl aluminum oxide and dibutyl zinc. In those catalysts, the carbon atom of an organic group is directly bonded with a metal of Group I or II or aluminum.

Those organometallic compounds have problems of stability and handling, because they are immediately ignited or decomposed if they are exposed to oxygen or water. Further, those catalysts are used in a large amount (more than 0.3 wt. %) for obtaining the lactone high polymers. After-treatments, such as the removal of the catalyst remaining in the lactone high polymer, are often required, because if such a relatively large amount of the catalyst remains in the lactone high polymer, it exerts bad influences on heat resistance and hydrolysis resistance of the polymer.

It has been well known to use a catalyst in the ring-opening polymerization of a lactone to form a lactone polymer having polyester main chain. As for the catalysts, there have been known various organic acids, inorganic acids, metals and their compounds. However, many of them have been known to be effective if they are used with an organic initiator, such as a polyhydric alcohol, in the preparation of a low polymer which is used for preparing polyurethanes. It has not been known that they are suitable for the preparation of the resinous lactone high polymers which are the intended products of the present invention.

For example, a process for preparing a lactone low polymer by polymerizing a lactone in the presence of an organic initiator and an inorganic acid catalyst has been known from the specification of U.S. Pat. No. 2,914,556.

The inorganic acid catalysts used in the examples are sulfuric acid, phosphoric acid, BF$_3$ etherate and hydrogen chloride. In the detailed description of the invention, zinc chloride, aluminum chloride, stannous chloride and stannic chloride are mentioned as catalysts, in addition to those given in the examples.

When those inorganic acid catalysts were used alone, without using the organic initiators, no increase in viscosity was recognized even after heating ϵ-caprolactone at 140° C. for 16 hours and a polymer was not obtained (Comparative Examples 24 and 26 given below) or even when a polymer was obtained, it was a waxy solid substance in many cases (Comparative Examples 1, 20 and 21 given below).

Other catalysts, different from the inorganic acids, for obtaining lactone polymers have been known. However, the polymers obtained in the presence of those catalysts are low polymers. For example, it has been reported that polycaprolactone obtained in the presence of potassium carbonate, as a catalyst, is a rigid, fragile, waxy polymer having an average molecular weight of about 4,000 [see Natta et al., J. Am. Chem. Soc., 56, 455 (1934)]. The inventors have examined the catalytic capacities of numerous other compounds for the lactone polymerization. A high polymer-forming catalytic activity was not recognized for many of them.

Thus, it has been quite difficult to prepare a resinous lactone high polymer having a practically sufficient mechanical strength. There has not been known a process wherein there is used a catalyst (which can be easily treated) other than the above described, specific organometallic compounds.

After intensive investigations on a process for preparing a lactone high polymer having a practically sufficient mechanical strength for use as a structural material in an advantageous manner under the circumstances as described above, the inventor has found that this goal can be attained by using a lactone of a low water content and a specific compound, as a catalyst. The present invention has been completed on the basis of this finding.

The present invention provides a process for preparing resinous, lactone, high polymers by the catalytic polymerization of lactones having a water content of less than 0.1 wt. %, which are subjected to ring-opening high polymerization, in the presence of a catalyst selected from the group consisting of stannous chloride, stannous bromide, stannous iodide, titanium trichloride, titanium tetrachloride, ammonium molybdate, zirconium nitrate, zirconium oxychloride and zirconium carboxylates.

In substantially all the conventional processes for the lactone polymerization, an organic initiator is used. The use of an organic initiator is advantageous for the preparation of low polymers, because the molecular weight of the product can be controlled and the polymerization reaction is accelerated so as to complete the reaction at a practical velocity. However, it is disadvantageous to use an organic initiator in a large amount in the preparation of a resinous lactone high polymer, because it increases the terminal group of the polyester and reduces the molecular weight thereof. For obtaining a resinous lactone high polymer, it is critical to use a catalyst having a sufficient, high polymerization velocity without relying on an organic initiator. An organic initiator can be used, however, with the catalyst, provided that the organic initiator is used in a small amount which does not inhibit the high polymerization. The catalysts used in the present invention have been discovered after investigations on a large number of compounds made from this point of view. Those catalysts could not be expected to be useful for this purpose, based on the known catalysts used for the low polymerization. For example, most of the inorganic acid catalysts for the low polymerization have no catalytic activity for the high polymerization as described above. Only stannous chloride exhibited a capacity of forming a high polymer without the aid of the organic initiator and, therefore, it could be used in the present invention. The catalytic activity of stannous chloride for the high polymerization of lactones was extremely specific in view of the fact that compounds analogous to stannous chloride, such as stannous compounds, for example, stannous fluoride and stannous sulfate, and stannic chloride have no catalytic capacity for forming a high polymer.

Stannous chloride can be handled easily, because it does not fume on exposure to air unlike known catalysts used for the polymerization.

In addition, it is sufficiently soluble in the lactone monomers and has substantially no toxicity. During storage for a long period of time, it absorbs a small quantity of water or it is partially oxidized into tin oxychloride, but the catalysis thereof for the high polymerization reaction is substantially not affected. Stannous bromide and stannous iodide are substantially equivalent to stannous chloride with respect to the ease of handling, low toxicity and catalytic activity. With those catalysts, substantially colorless, resinous polymers having a sufficiently high molecular weight can be obtained in a practical heating period of time.

Also, other catalysts used in the present invention have specific, catalytic activity for the high polymerization, unlike other analogous compounds, and they can be handled more easily than the conventional high polymerization catalysts comprising organometallic compounds.

As the zirconyl carboxylates, there can be used, preferably, zirconyl salts of monocarboxylic acids such as acetic acid, propionic acid, octanoic acid, stearic acid, naphthenic acid and benzoic acid. Further, zirconyl salts of polycarboxylic acids such as succinic acid, adipic acid and tartaric acid can also be used. Also, with the zirconyl carboxylates, substantially colorless polymers having sufficiently high molecular weights can be obtained, because no problem of fuming or decomposition occurs and such zirconium carboxylates can be handled easily.

Also, using ammonium molybdate or zirconium nitrate, polymers having high molecular weights can be obtained, because no problem of fuming or decomposition is caused and they can be handled easily.

Further, using zirconium oxychloride, titanium trichloride and titanium tetrachloride, substantially colorless polymers having high molecular weights can be obtained.

The amount of the catalyst used for the polymerization varies depending on the catalyst used, the properties of the starting lactone and the polymerization reaction conditions. Generally, the catalyst is used in an amount in the range of 0.0005–1.0 wt. %, based on the total amount of the lactone fed. Usually, the high polymer can be obtained, in the presence of the catalyst in an amount of as small as about 0.001–0.1 wt. %, in a relatively short period of time.

The reaction temperature is variable over a wide range, depending on the above described conditions. Generally, the reaction temperature is 50°–200° C., preferably 130°–170° C.

The polymerization reaction is preferably carried out in an inert atmosphere, such as nitrogen, from the viewpoint of avoiding coloring of the polymer and deterioration of the polymer or the catalyst. The polymerization reaction can be carried out by a mass polymerization process or in an organic solvent which is inert to the reaction. As the organic solvents that can be used for the reaction, there can be mentioned aromatic hydrocarbons, such as toluene and xylene, aliphatic hydrocarbons, such as heptane and decane, alicyclic hydrocarbons, such as cyclohexane and Decalin, chlorinated hydrocarbons, such as chloroform and trichloroethylene, esters, such as ethyl acetate and methyl butyrate, and ethers, such as THF and dioxane. The solvents used are substantially anhydrous.

The present invention is applied mainly to the polymerization of $\epsilon$-caprolactone to produce high polymers having the highest practical value. Further, the present invention can be applied to the polymerization of other lactones known to have a polymerization capacity substantially equivalent to that of $\epsilon$-caprolactone, i.e., lactones having a least 5 carbon atoms, preferably 6–12 carbon atoms in the ring. In those lactones, the carbon atoms in the ring can have alkyl group substituents.

As concrete examples of the lactones, there can be mentioned, for example, $\delta$-valerolactone, $\beta$-ethyl-$\delta$-valerolactone, $\epsilon$-caprolactone, $\alpha$-methyl-$\epsilon$-caprolactone, $\beta$-methyl-$\epsilon$-caprolactone, $\gamma$-methyl-$\epsilon$-caprolactone, $\beta,\delta$-dimethyl-$\epsilon$-caprolactone, 3,3,5-trimethyl-$\epsilon$-caprolactone, enanthlactone (7-heptanolide) and dodecanolactone (12-dodecanolide).

The water contents of the starting lactones should be less than 1%. By polymerizing a lactone having such a low water content, in the presence of the above catalyst, the desired, resinous, lactone, high polymers having a high tensile strength and elongation can be obtained. The strength required for using the polymer as a resinous structural material is increased as the molecular weight of the lactone polymer is increased. If the molecular weight is less than 10,000, the polymer is not resinous, but rather, is waxy. It appears that with a molecular weight of higher than 20,000, the desired mechanical strength of the resinous high polymer is obtained. The critical water content of the starting lactone required for obtaining a polymer of those desired properties is 0.1 wt. %. For obtaining high polymers of a higher strength, a substantially anhydrous lactone having a water content of as small as about 0.01% is subjected to the polymerization. The larger the molecular weight of the polymer, the more excellent are the mechanical properties of the polymer, such as tensile strength. The high polymer of ε-caprolactone maintains it strength sufficiently at a temperature of up to about 60° C. At or above this temperature, the high polymer is softened rapidly.

The present polymerization reaction, according to the invention, can be carried out in a batch, semicontinuous or continuous system. As the reaction vessel, there can be used equipment generally used for the production of polymers, such as a conventional stirring-type reactor having a strong stirring power or a kneader-type reactor.

The order of the addition of the catalyst and the lactone is not particularly limited. Generally, however, it is most preferred to add the catalyst to the reaction system containing the lactone, and, if necessary, an inert organic solvent, in a nitrogen atmosphere.

The following examples further illustrate the present invention. In the examples, all references to "%" mean % by weight, unless otherwise stated.

EXAMPLE 1

150 g of ε-caprolactone (water content: 0.005%) and 0.03 g (0.02%, based on the ε-caprolactone) of stannous chloride, as a catalyst, were charged in a 200 ml four-neck separable flask provided with a stirrer, nitrogen-introducing pipe, thermometer and condenser. After the replacement of the atmosphere with nitrogen, the mixture was allowed to react, under stirring, at 160° C. for 6 hours, to obtain a colorless, crystalline polyester. The resulting polyester was white and rigid and had the following properties:

Conversion of polymerization: 99.4% (determined by gas chromatography)
Number-average molecular weight: about 100,000 (determined by GPC)
Tensile strength: 499 Kgf/cm$^2$
Elongation: 849%

EXAMPLE 2

13 Kg of ε-caprolactone (water content: 0.015%) and 3.9 g (0.03%, based on the ε-caprolactone) of stannous chloride were charged in a 20 liter kneader and the mixture was allowed to react, under stirring, at 150° C. for 4 hours, to obtain a colorless, crystalline, resinous polyester.

Conversion of polymerization: 99.4%
Number-average molecular weight: about 70,000.

EXAMPLES 3–12 AND COMPARATIVE EXAMPLES 1–33

30 g of ε-caprolactone (water content: 0.005%) and 0.01 g of a catalyst were charged in a glass ampoule. After the replacement of the atmosphere with nitrogen, the ampoule was sealed under atmospheric pressure and the catalyst was dissolved sufficiently in the ε-caprolactone. Then, the mixture was allowed to stand at 140° C. for 16 hours.

The appearance and the percent conversion of polymerization are shown in Table 1.

High conversions were obtained in Examples 3–12 and resinous lactone high polymers were obtained therein, whereas merely waxy solids and low conversions were obtained in the comparative examples wherein other catalysts were used. In Comparative Example 4 wherein stannous hydroxide was used, a small amount of a high polymer having a molecular weight of 41,000 was obtained. However, even in this case, the product was waxy as a whole and a practical catalytic capacity for the high polymerization could not be recognized. Similar results were obtained in Comparative Examples 12 and 19. In Comparative Examples 1 and 20, the resulting polymers had low molecular weights and resinous high polymers could not be obtained, even though a sufficient polymerization velocity was obtained.

In other examples, the polymerization was scarcely carried out after heating for 16 hours. In addition to those shown in Table 1, the following compounds did not exhibit catalytic capacity for the high polymerization:

Tin (II) succinate, tin (II) citrate, tin (II) tartrate, stannous oxide, p-toluenesulfonic acid and tetramethyl ammonium chloride.

TABLE 1

| Example | Catalyst | Conversion | Appearance | Number-average molecular weight |
|---|---|---|---|---|
| Invention Examples | | | | |
| 3 | $SnCl_2$ | 99.5 | Resinous | 50000 |
| 4 | $SnBr_2$ | 99.5 | Resinous | 70000 |
| 5 | $SnI_2$ | 99.5 | Resinous | 127000 |
| 6 | $(NH_4)_2MoO_4$ | 97.9 | Resinous | 98000 |
| 7 | $TiCl_3$ | 98.2 | Resinous | 57000 |
| 8 | $TiCl_4$ | 95.3 | Resinous | 91000 |
| 9 | $Zr(NO_3)_4$ | 98.1 | Resinous | 70000 |
| 10 | $ZrOCl_2.8H_2O$ | 96.1 | Resinous | 74000 |
| 11 | $ZrO(C_{17}H_{35}COO)_2$ | 73.1 | Resinous | 93000 |
| 12 | $ZrO(CH_3COO)_2$ | 96.3 | Resinous | 96000 |
| Comparative Examples | | | | |
| 1 | $SnCl_4$ | 96.0 | Waxy | 1200 |
| 2 | $SnF_2$ | 46.9 | Waxy | |
| 3 | $SnSO_4$ | 0.0 | | |
| 4 | $Sn(OH)_2$ | 44.3 | Waxy | (41000) |
| 5 | $K_2SnO_3$ | 0.0 | | |
| 6 | $SnO$ | 0.0 | | |
| 7 | $Sn(CH_3.CH(OH)COO)_2$ | 0.0 | | |
| 8 | $Sn(C_{17}H_{35}COO)_2$ | 0.0 | | |
| 9 | $Sn(C_7H_{15}COO)_2$ | 0.0 | | |
| 10 | $H_2MoO_4.H_2O$ | 0.0 | | |

TABLE 1-continued

| Example | Catalyst | Conversion | Appearance | Number-average molecular weight |
|---|---|---|---|---|
| 11 | MoS$_2$ | 0.0 | | |
| 12 | MoO$_3$ | 37.0 | Waxy | |
| 13 | Ti(NO$_3$)$_4$ | 0.0 | | |
| 14 | Ti$_2$(SO$_4$)$_3$ | 12.9 | Liquid | |
| 15 | Hydroxytitanium stearate | 8.2 | Liquid | |
| 16 | ZrO$_2$ | 0.0 | | |
| 17 | Zr(OH)$_4$ | 0.0 | | |
| 18 | Zr(SO$_4$)$_2$ | 0.0 | | |
| 19 | Zirconium ammonium acetate | 47.6 | Waxy | |
| 20 | BF$_3$.(C$_2$H$_5$)$_2$O | 99.3 | Waxy | 16000 |
| 21 | H$_2$SO$_4$ | 43.1 | Waxy | |
| 22 | CF$_3$COOH | 0.0 | | |
| 23 | LiCl | 0.0 | | |
| 24 | AlCl$_3$ | 0.0 | | |
| 25 | (C$_3$H$_7$O)$_2$Al(OC$_3$H$_4$COOC$_2$H$_5$) | 0.0 | | |
| 26 | ZnCl$_2$ | 0.0 | | |
| 27 | PdCl$_2$ | 0.0 | | |
| 28 | MgCl$_2$ | 0.0 | | |
| 29 | Ce(NO$_3$)$_3$ | 0.0 | | |
| 30 | CdCl$_2$.5/2H$_2$O | 0.0 | | |
| 31 | Cd(CH$_3$COO)$_2$ | 0.0 | | |
| 32 | BeSO$_4$ | 0.0 | | |
| 33 | Ba(CH$_3$COO)$_2$ | 0.0 | | |

EXAMPLES 13-22

ε-caprolactone was polymerized in the presence of stannous chloride catalyst. Conversion of polymerization with heating time in the range of from 1 to 6 hours is shown in Table 2. Colorless, resinous high polymers were obtained in the respective examples.

TABLE 2

Conversion of polymerization versus time

| Example | Catalyst (ppm) | Heating temp. (°C.) | 1 hr. | 2 hrs. | 4 hrs. | 6 hrs. | Number-average molecular weight ($\times 10^4$) |
|---|---|---|---|---|---|---|---|
| 13 | 333 | 140 | 16.3 | 24.7 | | 93.7 | |
| 14 | 333 | 160 | 90.4 | 97.3 | | 99.8 | 5.45 |
| 15 | 333 | 160 | 64.8 | 77.5 | | 99.5 | 4.93 |
| 16 | 667 | 150 | 79.8 | 92.3 | 96.2 | 99.8 | |
| 17 | 333 | 150 | 77.8 | 96.3 | 99.5 | 99.7 | 2.35 |
| 18 | 333 | 150 | 13.1 | 42.5 | 58.1 | 94.5 | 5.26 |
| 19 | 200 | 150 | 21.8 | 48.2 | 78.8 | 94.2 | 5.10 |
| 20 | 200 | 150 | 18.6 | 52.9 | 96.7 | 99.6 | 6.39 |
| 21 | 200 | 160 | 37.0 | 71.9 | 89.6 | 99.4 | |
| 22 | 200 | 160 | 3.6 | 44.3 | 84.9 | 99.1 | |

The reaction vessels used were a stainless steel vessel in Example 14 and glass vessels in the other examples. The water contents of the starting lactones were 0.1% in Example 17, 0.005% in Example 18 and 0.008% in the other examples. The catalysts used were 200 ppm of SnCl$_2$.2H$_2$O in Example 22 and SnCl$_2$ in the other examples. In all the examples, except Example 20, a given amount of the catalyst was previously dissolved in lactone. In Example 20, the catalyst was dissolved in 10% of the lactone, then, the heating was initiated and the remaining 90% of the lactone was added dropwise thereto over one hour.

The embodiments of the invention in which an exclusive property or privilege is claimed are defined as follows:

1. A process for preparing a rigid polymer having a number-average molecular weight of higher than 20,000, which comprises the steps of polymerizing a polymerizable lactone monomer having a water content of less than 0.1 percent by weight, in the presence of a catalytically effective amount of a catalyst selected from the group consisting of stannous chloride, stannous chloride dihydrate, stannous bromide, stannous iodide, titanium trichloride, titanium tetrachloride, ammonium molybdate, zirconium nitrate, zirconium oxychloride and zirconyl carboxylates, until said polymer is formed; and then recovering said polymer.

2. A process as claimed in claim 1 in which the polymerization temperature is from 50° to 200° C.

3. A process as claimed in claim 1 in which the polymerization temperature is from 130° to 170° C.

4. A process as claimed in claim 1, claim 2 or claim 3 in which the amount of said catalyst is from 0.0005 to 1.0 wt. %, based on the weight of said lactone.

5. A process as claimed in claim 1, claim 2 or claim 3 in which the amount of said catalyst is from 0.001 to 0.1 wt. %, based on the weight of said lactone.

6. A process as claimed in claim 1 in which the polymerization is performed by bulk polymerization or by solution polymerization wherein said lactone is dissolved in an inert organic solvent, and the polymerization is carried out in the substantial absence of water and organic initiator and under an inert gas atmosphere.

7. A process as claimed in claim 1, in which said lactone is selected from the group consisting of δ-valerolactone, β-ethyl-δ-valerolactone, ε-caprolactone, α-methyl-ε-caprolactone, β-methyl-ε-caprolactone, γ- methyl-ε-caprolactone, β,δ-dimethyl-ε-caprolactone, 3,3,5-trimethyl-ε-caprolactone, enanthlactone and dodecanolactone.

8. A process as claimed in claim 1 in which said catalyst is stannous chloride, stannous chloride dihydrate, stannous bromide or stannous iodide.

9. A process as claimed in claim 1 in which said catalyst is titanium trichloride or titanium tetrachloride.

10. A process as claimed in claim 1, in which said catalyst is ammonium molybdate.

11. A process as claimed in claim 1 in which said catalyst is zirconium nitrate or zirconium oxychloride.

12. A process as claimed in claim 1 in which said catalyst is zirconyl salt of mono- or polycarboxylic acid.

13. A process as claimed in claim 1 in which said lactone is ε-caprolactone.

14. A process as claimed in claim 1 in which said lactone has at least five carbon atoms in the ring.

15. A process as claimed in claim 1 in which said lactone has six to twelve carbon atoms in the ring.

* * * * *